United States Patent [19]

Terashita

[11] Patent Number: 4,860,059
[45] Date of Patent: Aug. 22, 1989

[54] METHOD OF SETTING COLOR COPYING CONDITIONS

[75] Inventor: Takaaki Terashita, Kanagawa, Japan

[73] Assignee: Fuji Photo Film Co., Ltd., Kanagawa, Japan

[21] Appl. No.: 157,812

[22] Filed: Feb. 19, 1988

[30] Foreign Application Priority Data

Feb. 20, 1987 [JP] Japan .................................. 62-37249
Feb. 20, 1987 [JP] Japan .................................. 62-37250

[51] Int. Cl.⁴ ............................................. G03B 27/73
[52] U.S. Cl. ........................................ 355/38; 355/77; 355/208; 355/214; 355/327; 364/526; 250/226
[58] Field of Search ....................... 355/32, 35, 38, 77, 355/4; 356/421–424

[56] References Cited

U.S. PATENT DOCUMENTS 4,657,378  4/1987  Hope et al. ............................ 355/38

Primary Examiner—L. T. Hix
Assistant Examiner—David Gray
Attorney, Agent, or Firm—Sughrue, Mion, Zinn, Macpeak & Seas

[57] ABSTRACT

A method of setting the copying conditions of a color copying machine includes the steps of scanning a test chart having density patterns in three primary colors, to detect three color components of the light reflected from the test chart, based on which three color exposures are obtained. The test chart is scanned again to make a color copy thereof, and the color copy is scanned to detect three color components of the light reflected therefrom, based on which three color densities are obtained. Relationships between the three color exposures and the three color densities are obtained for the three colors. Based on the relationships, three primary color filters are adjusted to regulate three color components of the light passed therethrough, thereby controlling three color exposures.

33 Claims, 10 Drawing Sheets

METHOD OF SETTING COLOR COPYING CONDITIONS

BACKGROUND OF THE INVENTION

The present invention relates to a method of setting color copying conditions in color image copying and more particularly to a method of setting color copying conditions when copying half-tone color images from color originals.

In copying color images from color originals, using color image copying machines such as electronic color image copiers, ink-jet color printers, laser color printers, photographic color printers using reversal color paper or diffusion transfer type photosensitive materials, video color image copiers apparatus, or heat sensitive copying machines, it is essential to reproduce a color image with both proper color density and proper color balance. To provide well finished color copies, color copying machines are generally adjusted to a proper color copying condition when starting operations and periodically thereafter. The important factors on which the color density and color reproductivity of color copies depend are the dispersion in performance of the copying lens systems, changes in the copying lens system due to aging, dispersion in characteristics of developers, developer changes due to aging, and changes in developing conditions. Therefore, color copying machines, even of the same type, set their color copying conditions individually. For example, in silver salt diffusion transfer processing type color copying machines, the optical factors are dispersion and the changes due to aging of the light source, the copying lens, color filters, reflection mirrors, light sensors, the scanning speed at which a color original is scanned, and the like. The factors which depend on photographic materials are the types of and the changes due to aging of the photosensitive materials, the differences in manufacturing batches, and the like. The factors which depend on developing materials include the characteristic dispersion and changes due to aging of developers. Furthermore, the factors which depend on developing conditions include the time of developing, the temperature of developing, and the like. In electrophotographic copying machines, other factors include the sensitivity dispersion and the changes due to aging of the photosensitive drums, the characteristic dispersion and changes due to aging of toners, and the characteristic dispersion and changes due to aging of chargers.

Heretofore, various systems for setting color copying conditions have been well known. One such method, as is disclosed in, for example, Japanese Patent Unexamined Publication No. 57-7051, comprises providing a standardized density pattern near a table on which a color original is placed, optically exposing a photosensitive drum to the standardized density pattern to form an electostatic latent image on the drum, detecting a surface voltage of the electrostatic latent image, and controlling the charge and exposure of the photosensitive drum in such a way as to equalize the detected surface voltage to a desired value.

In another system, as is described in Japanese Patent Unexamined Publication No. 57-60348, a standardized density pattern is disposed adjacent to the available area of a table on which a color original is placed. A toner image of the standardized density pattern is formed on a photosensitive drum and the density of the toner image is detected by means of a special densitometer. The charge and exposure of the photosensitive drum is controlled in such a way as to equalize the detected density to a desired value.

A third system is disclosed in Japanese Unexamined Patent Publication No. 61-14663, where, while controlling the luminance of a light source or developing a bias voltage for the developing device during copying, a black and white copy with strips having different densities is made. This black and white copy is visually examined to set the proper density settings.

As disclosed in Japanese Unexamined Patent Application No. 60-243649, an electrostatic latent image of a test chart is formed on a photosensitive drum while increasing or decreasing the exposure. A toner image of the electrostatic latent image formed on paper is visually examined to determine the proper exposure.

A problem associated with the above described systems is the difficulty in setting the copying conditions with high accuracy. For example, in the first system, it is difficult to set the color copying conditions in consideration of the developing conditions, the characteristic dispersion, and changes due to aging of the development materials. It is also difficult to set accurate color copying conditions because a corrected exposure is determined based upon the density of a single point, on the assumption that charging is proportional to exposure. Further, the use of this technique is limited to specific types of copying machines.

The second system described above allows setting the color copying conditions in consideration of the changes and dispersion of various factors, in that a special densitometer is employed to measure the density of the toner image. However, since measurement is effected at a single point, it is hard to set correct color copying conditions. It is also difficult to apply this system to silver salt type copying machines or color copying machines using diffusion transfer type photographic materials.

The remaining color copying systems require visual examination of a black and white copy in order to correct the exposure levels. High skill is required to correct the exposures for all three colors (blue, red, and green) to provide well balanced copies.

SUMMARY OF THE INVENTION

It is an object of the present invention to provide a method of setting color copying conditions with high accuracy. It is another object of the present invention to provide a color copying condition setting method which can be applied to various types of color copying machines.

In the invention, a test chart having a plurality of density patterns for each of the three primary colors is employed. Each pattern includes a plurality of smaller divisions having different densities. The test chart is placed on a table on which color originals to be copied are placed and is scanned to measure the three color components of the reflected light so as to detect the light intensities based on which exposures are determined for each of the three colors. After the light intensity measurement, the test chart is again scanned to make a color copy thereof. The color copy is then placed on the table and scanned to measure the three color components of the reflected light to detect the densities of each of the three colors as copied. Characteristic data of the copy density with respect to the exposure is prepared for each color. Color filters, for example cyan, magenta and yellow filters for regulating the three color components of the copying light are controlled so as to make the three prepared characteristics coincide with standardized characteristic data previously prepared individually for each of the three colors.

Based on the measured and the standardized characteristic data, exposure differences for the same copy density are calculated. The color filters are controlled so as to cancel the exposure differences.

The invention also allows the use of a pseudo test chart which is prepared by variously combining color filters such as cyan, magenta and yellow filters.

BRIEF DESCRIPTION OF THE DRAWINGS

The present invention will be described with reference to plural embodiments shown in the accompanying drawings, wherein identical reference numerals designate identical or similar parts throughout the several views, and in which.

DETAILED DESCRIPTION OF THE PREFERRED EMBODIMENTS

Figure 1:
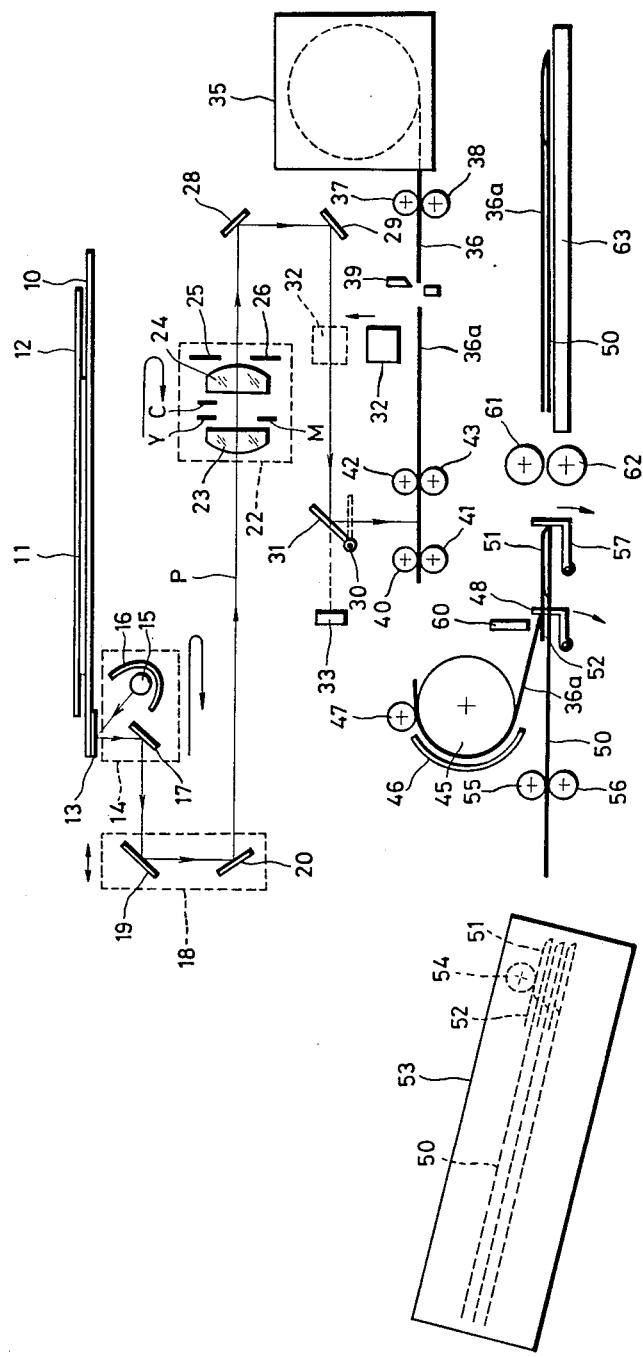
FIG. 1 is a fragmentary cross-sectional illustration showing a color copying machine using a silver salt diffusion transfer process and embodying the present invention.

Referring now to FIG. 1, there is illustrated a silver salt diffusion transfer processing type copying machine in which the color image copying condition setting method according to the present invention is embodied. On a transparent table 10, a test chart 11 is placed in position with its front surface down and covered by a opaque cover 12 having a white inner surface. On the under surface of the transparent table 10 is provided a standardized reflection plate 13 which reflects light which is in turn detected to check the light intensity of the lamp 15 and the transmittances of the color filters, as described subsequently.

Light source unit 14 includes illumination lamp 15, reflector 16, and reflection mirror 17. Unit 14 is capable of reciprocally moving in parallel with the table 10 to scan lengthwise over the test chart 11 on the table 10 with the illuminating light. Scanning can take place using either the slit method or a flying spot. Mirror unit 18 supports therein a pair of reflection mirrors 19, 20 disposed facing its each other at a 90° angle so as to reflect light through 180°. The mirror unit 18 is maintained in a selected position but is moved when the copying ratio is changed.

A lens unit 22 has front and rear lens groups 23, 24, each of which is depicted as a single element lens group for simplicity. Also included are yellow Y, cyan C and magenta M color filters disposed between the front and rear lens groups, and oppositely movable aperture plates 25, 26 disposed behind the rear lens group 24. The lens unit 22 is synchronized with the light source unit 14 to focus an image of the test chart 11 on photosensitive paper 36. Each filter Y, C, M is independently movable into and out of the optical path of the first and second lens groups 23, 24 so as to regulate the amount of exposure light passed therethrough in order to control the light components and hence the color balance of the exposure light.

Fixed mirrors 28, 29 are used to direct light from the lens unit to a swingable mirror 31, which in turn is made capable of directing light to the photosensitive paper 36. The swingable mirror 31 is pivoted at 30, and swings out of the light path during pre-scanning so as to allow light reflected from the test chart 11 to reach a light measuring unit 33.

Figure 2:
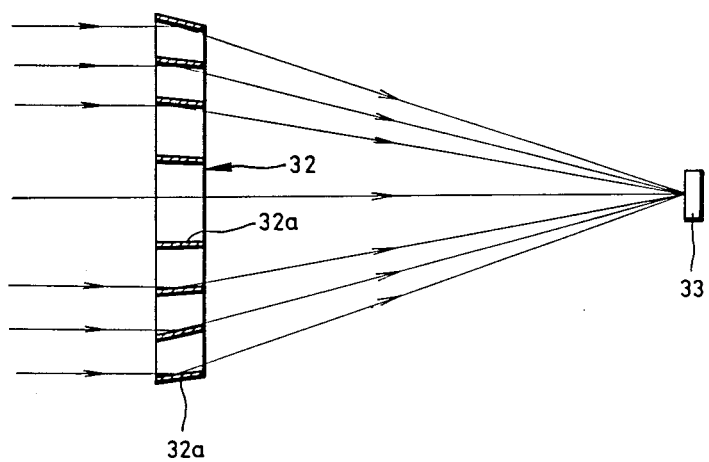
FIG. 2 is a cross-sectional view of a light collecting means used the color copying machine of FIG. 1.

A light collecting mirror unit 32 is brought into the optical path as shown by the dotted line in FIG. 2 when pre-scanning is conducted. As is shown in detail in FIG. 2, the light collecting mirror unit 32 comprises a plurality of reflection mirrors 32a arranged to reflect incident light toward the light measuring unit 33.

Figure 3:
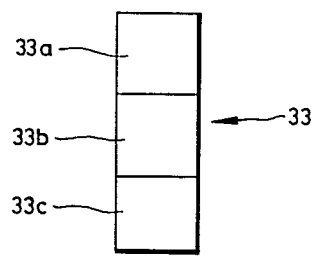
FIG. 3 is a fragmentary illustration of a light measuring means used in the color copying machine of FIG. 1.

As is shown in FIG. 3, the light measuring unit 33 comprises sensors 33a, 33b and 33c for red, green and blue light, respectively, to allow the detection of the light components in the respective colors.

Paper magazine 35 contains a roll of the photosensitive paper 36 which is processable using a silver salt diffusion transfer method. The paper 36 is withdrawn by means of a pair of rollers 37, 38 disposed in front of the paper magazine 35, and is cut to a predetermined length by means of a cutter 39. A cut paper sheet 36a thus formed is nipped at its forward end by a pair of rollers 42, 43. Between the pair of rollers 42, 43 and a second pair of supporting rollers 40, 41 there is formed an exposure space located just beneath the swingable mirror 31.

During the copying of an image of a color original, rollers 40-43 are driven in synchronism with the movement of the light source unit 14 to transport the paper sheet 36a toward a rotary drum 45. Disposed surrounding the rotary drum 45 are a guide member 46 and a guide roller 47. The paper sheet 36a, after having been exposed to the light reflected by the test chart 11, is transported by the rotary drum 45 until it is stopped by abutting a first stopper 48.

An image receiving sheet holding cassette 53 is mounted on the copying machine. In the cassette 53 there is a stack of diffusion transfer processing type image receiving sheets 50, each of which is provided at its leading end with a rupturable pod containing a processing liquid and a funnel member 52 for leading the processing fluid out of the pod. A feeding roller 54 is brought into contact with the upper most image receiving sheet 50 upon mounting the cassette 53 on the copying machine. The roller 54 feeds the uppermost sheet to a pair of nip rollers 55, 56 during pre-scanning. Upon exposing the photosensitive paper sheet 36a, the nip rollers 55, 56 are driven in a well known manner to transport the image receiving sheet 50 to second stopper 57 which halts the image receiving sheet 50 at its leading end and places it in position. It is to be noted that the nip rollers 55, 56 nip the side margins of the image receiving sheet 50 so as to avoid accidentally releasing the processing liquid within the pod 51. The photosensitive paper 36 and the image receiving sheets 50 are the same in mechanical and chemical construction as those well known in the instant photography art and now available on the market.

The exposed photosensitive paper sheet 36a is attached at its leading end to the image receiving sheet 50 with the aid of, for example, heat sealing means 60. The coupled sheets are then passed between a pair of pressure applying rollers 61, 62 so as to rupture the pod and release the processing liquid between the two sheets. As the sheets 36a and 50 are passed between the pressure applying rollers 61, 62, the released processing liquid is distributed between the sheets in a thin uniform layer. For short time duration diffusion transfer processing, the overlapped sheets as a unit are placed on a constant temperature plate 63 for a given time. By separating the image receiving sheet 50 from the photosensitive paper sheet 36a, the finally developed image of the test chart 11 may be visualized on the image receiving sheet 50.

Figure 4:
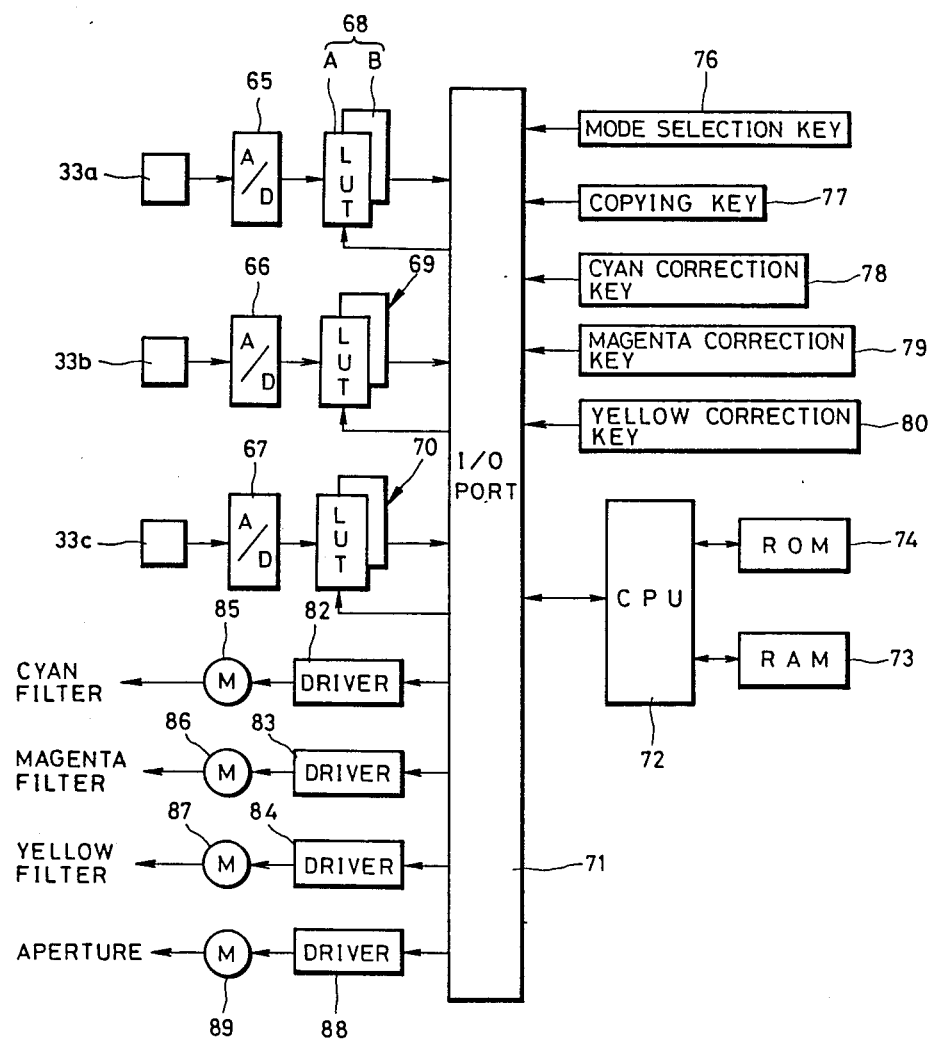
FIG. 4 is a block diagram of an exposure condition setting means used in the color copying machine of FIG. 1.

FIG. 4 illustrates the copying condition setting circuit. Sensors 33a, 33b and 33c which may be designated as red, green and blue sensors, respectively, receive light and provide electrical signal according to the amounts of light which they receive. These signals, after amplification, are converted to digital signals by means of A/D converters 65, 66, 67, respectively. The digital signals are then subjected to signal processing in look-up tables 68, 69 and 70. Each look-up table includes two data tables A and B. Data table A contains data for correcting the signal for the sensitivity of each sensor to provide data on the corrected exposure. Data table B memorizes data for correcting the signal according to the sensitivity of each sensor and converts the corrected signal into logarithmic form. Each look-up table is controlled by a signal from the I/O port 71 to select table data A, B.

The outputs from the look-up tables 68-70 are sent to RAM 73 through I/O port 71 and CPU 72. The CPU 72 executes operations according to a program sequence memorized in ROM 74, as described hereafter.

Connected to the I/O port 71 are a mode selection key 76 for selecting either the copying condition setting mode or the reproduction mode, a reproduction key 77 for starting the operation of the machine according to the selected mode, and color correction keys 78-80 for manually setting desired color corrections with respect to the automatically set copying exposures.

Upon setting the copying exposures or manually effecting color corrections, the CPU 72 causes motors 85-87 to rotate via drivers 82-84 so as to adjust the color filters Y, M and C. A driver 88 is provided to start motor 89 so as to move the aperture plates 25, 26 close to or apart from each other in order to regulate the amount of light passing therethrough.

Figure 5:
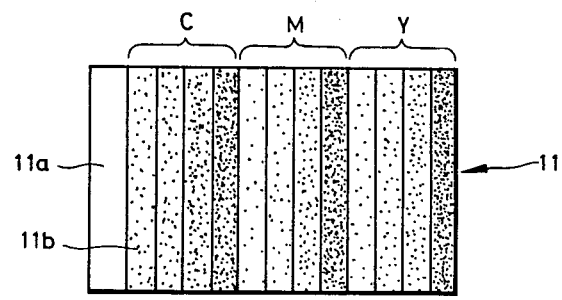
FIG. 5 is an explanatory illustration of a test chart.
Figure 7:
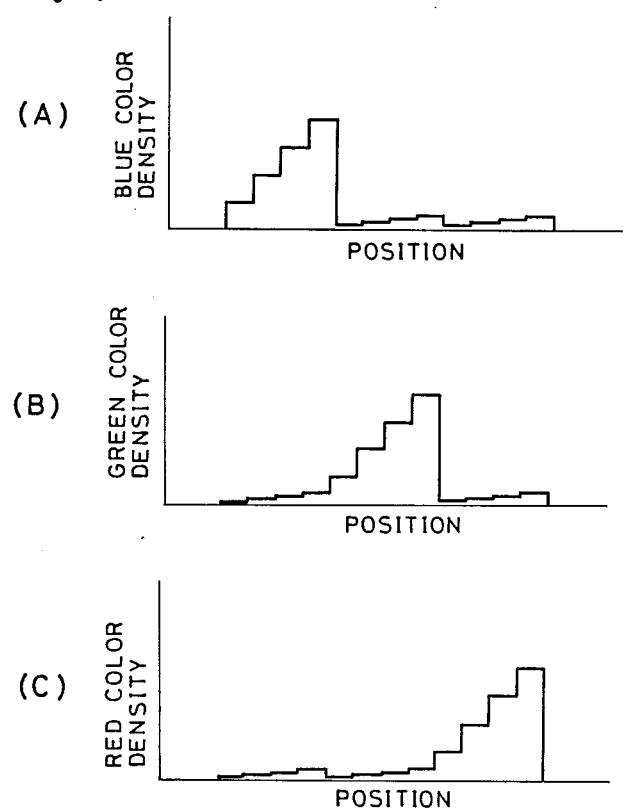
FIG. 7 graphically illustrates the density distributions of the test chart of FIG. 5.

Referring now to FIG. 5, an example of a test chart is shown. The test chart 11 is provided at one end with a white division 11a, and a plurality of filter strips 11b with different densities are provided thereafter and are distributed at regular intervals. The test chart 11 is placed on the table 10 in such a way that the strips 11a and 11b extend perpendicularly to the direction in which the light source unit 14 moves. In this embodiment, the test chart 11 has four strips 11b for each color, each of a different density. Thus, in total, the test chart 11 has one white strip and four different gradations of each of cyan, magenta and yellow.

Figure 6:
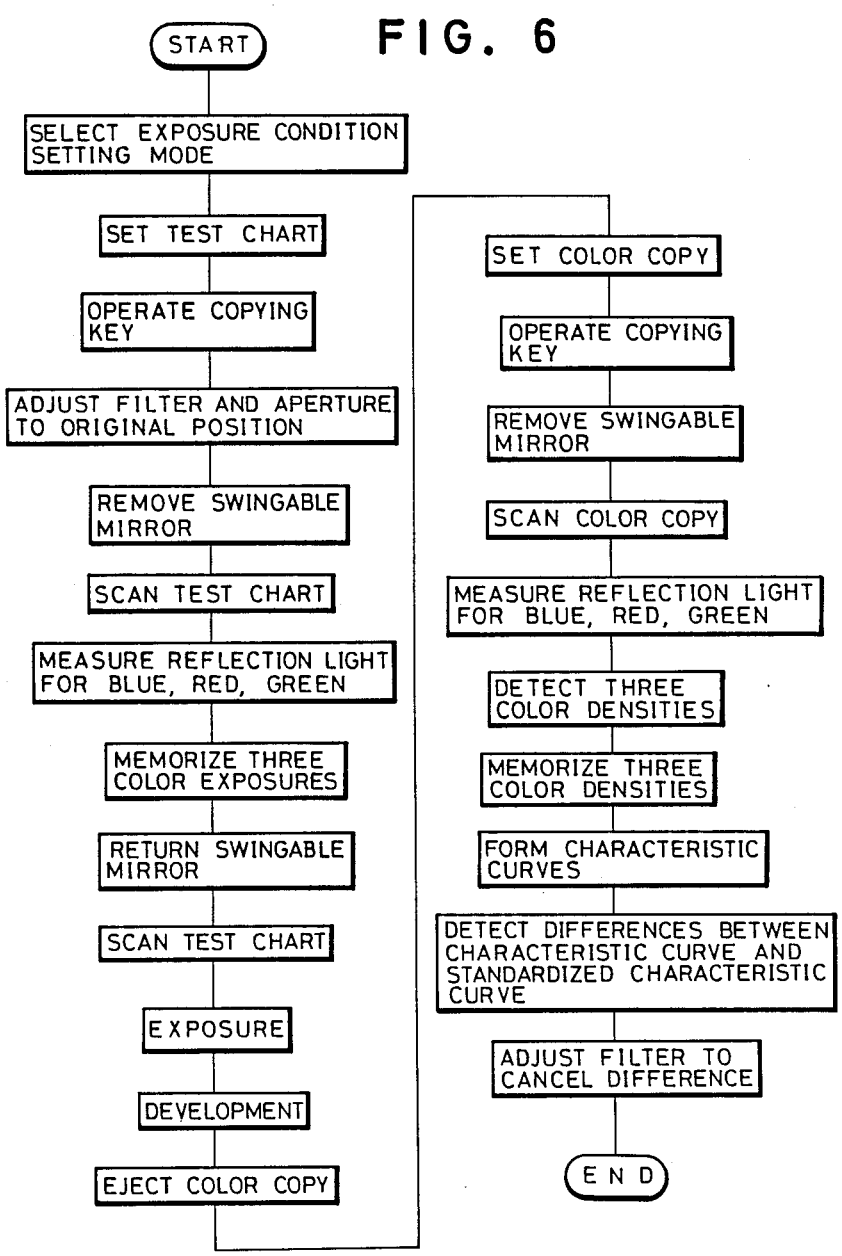
FIG. 6 is a flowchart showing one example of how the copying conditions are set in the color copying machine of FIG. 1.

The method by which copying conditions are set will now be described with reference to FIG. 6. The mode selection key 76 is operated to select the copying condition setting mode. After placing the test chart 11 on the table 10, the reproduction key 77 is operated to start the copying condition setting operation. Motors 85-89 start to rotate, setting the filters Y, M and C and the aperture plates 26, 26 to their normal positions. Simultaneously, the light collecting mirror unit 32 and the swingable mirror 31 are moved to the positions shown in dotted lines in FIG. 1. Thereafter, the light source unit 14 and the lens unit 22 move in synchronism with each other to effect a first scan of the standardized reflection plate 13 and the test chart 11 with illuminating light.

The light reflected from the standardized reflection plate 13 and the test chart 11 is directed toward the light collecting unit 32 via mirrors 17, 19, 20, lens unit 22, and mirrors 28, 29 in this order. As is shown in FIG. 2, the light collecting mirror unit 32 collects all or part of the reflected light and directs it to the light measuring unit 33. The light measuring unit 33 has sensors 33a to 33c individual to each color, and thereby detects the three color components of the light.

Outputs from the sensors 33a to 33c are, after being converted into digital signals, sent to the look-up tables 68-70 by color. On the first scan, each look-up table selects table B, and the digital signal is transformed into a logarithmic value to provide exposure data which is in turn memorized in the RAM 73.

When the light source unit 14 reaches the right extremity in FIG. 1, the first scan is completed and the copying mode can commence. At this time, the swingable mirror 31 is brought into the optical path P and the light collecting mirror unit 32 is moved out of the optical path. Thereafter, transportation of the photosensitive paper 36 and the image receiving sheet 50 is carried out. In more detail, the rollers 54 to 56 start their rotation, so as to withdraw the foremost image receiving sheet 50 until the image receiving sheet 50 is stopped at the second stopper 57. The rollers 37 and 38 simultaneously start their rotation, so as to withdraw the photosensitive paper 36 by a predetermined length. Upon drawing out a predetermined length of paper 36, the rollers 42 and 43 nip the leading end of the paper and, simultaneously, the cutter 39 cuts the paper to a predetermined length to provide the paper sheet 36a. Photosensitive paper sheet 36a is further transported until the leading end thereof is nipped by the rollers 40, 41. When the sheet 36a is in position, the rollers 40-43 all stop.

When the photosensitive sheet 36a and the image receiving sheet 50 are both in position, the light source unit 14 returns to its initial position so as to effect a second scan of the test chart 11. In synchronism with the movement of the light source unit 14 to the left as viewed in FIG. 1, the rollers 40-43 rotate to continuously transport and expose the photosensitive paper sheet 36a to illuminating light. In this manner, a latent image of the test chart 11 is formed in the photosensitive paper. The sheet containing the latent image thereon is transported by the rotary drum 45 and is placed in position at the first stopper 48. When the photosensitive sheet is stopped at the first stopper 48, the rotary drum 45 stops to maintain the rear end of the photosensitive sheet between the roller 47 and the drum 45. When the rotary drum 45 stops, the first stopper 48 is moved out of the path of the photosensitive sheet 36a.

Next, the rollers 55 and 56 are actuated to rotate and thereby transport the image receiving sheet 50 under the photosensitive sheet 36a. When the leading end of the sheet 50 is stopped by the second stopper 57, the rollers 55 and 56 are stopped so as to position the sheet 50 such that the funnel member 52 overlaps the leading end of the sheet 36a. The heat sealing device 60 moves downwardly to weld the leading end of the photosensitive sheet to the funnel member 52. Due to this welding operation, the sheet 36a is maintained in correct registry with the image receiving sheet 50 during processing so as to prevent the reproduced image from being blurred or changed in position. To enable easy welding, a hot melt adhesive agent is applied to the upper surface of the funnel member 52 in advance.

After the second stopper 57 has been removed from the path of the sheet 50, the rollers 45 and 46 are actuated again so as to forward the overlapped sheets 36a, 50. During this advancement, the roller 47 rotates following the movement of the sheet 36a. Since the pressure applying rollers 61, 62 are synchronized with the rollers 55, 56, the pressure applying rollers 61, 62 nip and transport the overlapped sheets 36a, 50 therebetween while applying pressure. When the leading end of the image receiving sheet 50 passes between the pressure applying rollers 61, 62, the pod 51 is ruptured to release the processing liquid between the overlapped sheets. As the sheets continue to be transported, the processing liquid is distributed in a uniform layer. The overlapped sheets are then left on the constant temperature plate 63, which is heated to approximately 25° C., for a predetermined time. After this time, the sheet 50 is separated from sheet 36a to provide a color positive image of the test chart 11 reproduced thereon by the well known diffusion transfer processing technique.

Thereafter, the test chart 11 is replaced with the color copy (the sheet 50 on which the test chart 11 has just been copied) and the copying key 77 is again operated to start a third scan which is effected in the same manner as the first scan so as to measure the color components of the copy using the measuring unit 33. In this third scan, each look-up table 68, 69, 70 selects table B to provide an output from the sensor 33a, 33b, 33c in logarithmic form. Based on the logarithmic outputs of the standardized reflection plate and the color copy, the look-up table provides a density signal representing a copy density. This density signal is memorized in the RAM 73 to finish the third scan. After the third scan, the light source unit 14 returns to its initial position shown in FIG. 1.

Figure 8:
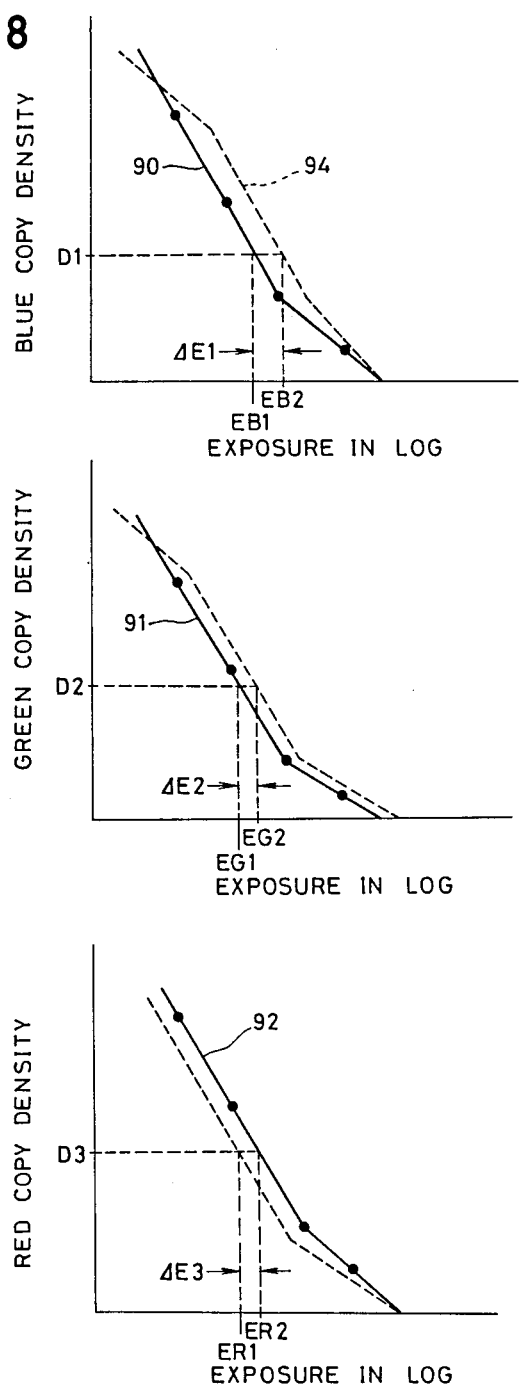
FIG. 8 graphically illustrates the relationship of filter position to the logarithm of exposure for each of the three colors.

The CPU 72 retrieves the logarithmically transformed signals representative of the exposure obtained by the first scan and the copy density obtained by the third scan from the RAM 73 and provides characteristic data 90, 91, 92 indicating the relationship between logarithmically transformed exposures and copied densities for each color, as shown in FIG. 8. In this embodiment, the color copy is measured at four points for each color, and the densities of adjacent divisions are connected by a straight line. Densities outside the opposite end points are shown as extensions of the straight lines connecting the two adjacent points. Alternatively, the characteristic data may be formulated by deriving a characteristic curve which intersects the respective four density points according to a Lagrange interpolation. The characteristic data sets 90-92 are used either as table values or in equational form (using either the straight lines or the generated curve).

The characteristic data are used in the following manner. Taking blue as an example, an exposure EB1 is obtained from the characteristic curve 90 for a point specified by density D1, while an exposure EB2 is obtained from a standardized characteristic curve 94 for the same density. The exposure difference $\Delta E1$ between the exposures EB1 and EB2 is obtained. In the same manner, exposure differences $\Delta E2$ and $\Delta E3$ are obtained for red and green. The standardized characteristic data may be provided in the ROM in advance, either when designing the copying machine or in the previously described manner when installing the copying machine.

After the exposure differences are obtained, the light source 14 is ready for the next scan. The standardized reflection plate 13 is illuminated and the light reflected thereby is measured by the light measuring means 33 to detect the exposures for the three colors. According to the three color exposures, the color filters Y, M and C are adjusted in such a way as to cancel the exposure differences for each of the colors, thereby completing the setting of the color copying conditions.

Figure 9:
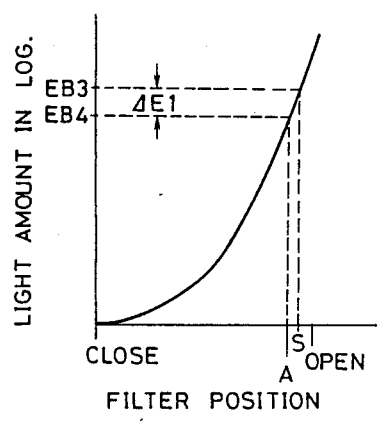
FIG. 9 illustrates the relationship between filter position and the logarithm of the amount of light.

The standardized white color reflection plate may be replaced with a gray color reflection plate. Alternatively, a characteristic curve of the relationship between the filter position and the logarithm of light quantity may be used to adjust the color filters Y, M and C. Taking the yellow filter Y as an example, as is shown in FIG. 9, the amount of light EB4 which is distanced $\Delta E1$ from the amount of light EB3 when the yellow filter Y is at its normal position S is determined. Using the characteristic curve, a position A at which the yellow filter can provide light amount EB4 is determined. Subsequently, the yellow filter Y is moved to the position A from the normal position S.

After setting the color copying conditions, the mode selection key 76 is operated to select the copy mode. As a result of this selection, the light collecting mirror unit 32 is brought into the optical path P and the swingable mirror 31 is moved out of the optical path. A color original to be copied is placed on the table 10 and is covered with the light opaque cover 12. Thereafter, when operating the copying key 77, the color original is copied in the same manner as the test chart 11 was copied. The color original is copied with the light source unit 14 moving toward the right as viewed in FIG. 1.

Figure 12:
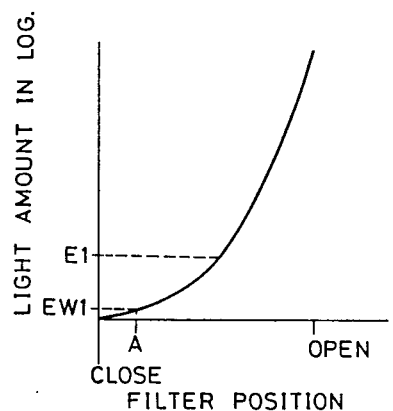
FIG. 12 is a graph similar to that of FIG. 9 showing the relationship between filter position and the logarithm of the amount of light.
Figure 10:
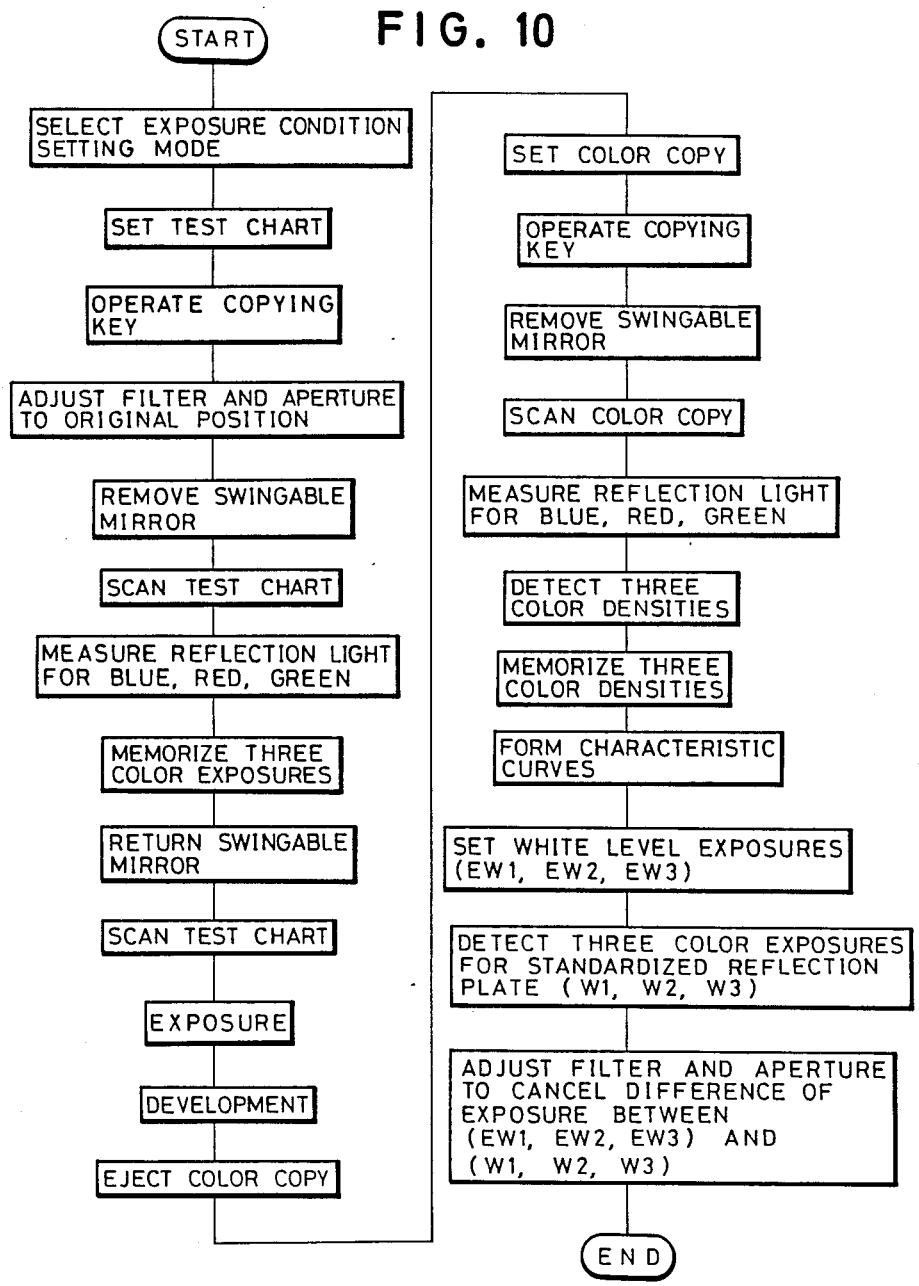
FIG. 10 is a flowchart similar to that of FIG. 6 but showing another example of how the copying conditions of the color copying machine of FIG. 1 may be set.
Figure 11:
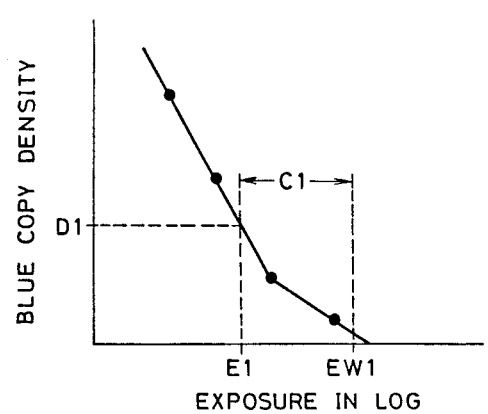
FIG. 11 is a set of graphs similar to those of FIG. 8, each showing the relationship between position and the logarithm of the exposure.
Figure 11:
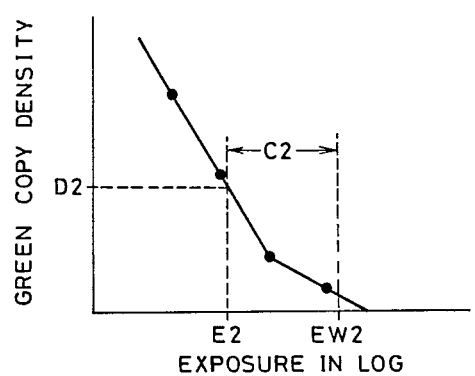
Figure 11:
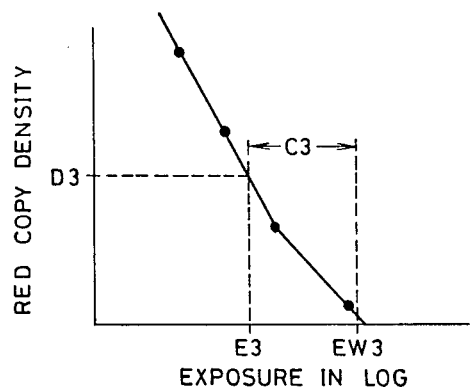

Reference is now made to FIGS. 10-12 which illustrate another preferred embodiment of the invention, also usable in the same copying machine shown in FIGS. 1-4. In this embodiment, the same characteristic curves 91, 92 and 93 as obtained in the previous embodiment and shown in FIG. 8 are employed. As is shown in FIG. 11 and is apparent from the previous description, the characteristic curves 91-93 for each color represent the relationship between the exposure in log obtained as a result of the first scan and the densities of the color copy obtained as a result of the third scan. Using the characteristic curves 91–93, the exposure needed to provide a predetermined or selected density of copy is determined for each color. This exposure is added together with a certain or predetermined exposure so as to obtain a white-level exposure for each color. For example, a properly exposed color copy is measured to obtain color densities at four points. A color copy density D1, D2 and D3 is preselected between the two intermediate densities for each color (see FIG. 11). An exposure E1, E2 and E3 corresponding to the preselected color density D1, D2, D3 is obtained based on the characteristic curve 91, 92, 93, respectively. A certain exposure C1, C2, C3 is then added to the exposure E1, E2, E3, respectively, to provide the white-level exposure EW1, EW2 and EW3. Gray-level exposures may be provided in place of the white-level exposures EW1–EW3. If gray-level exposures are desirable, the white standardized reflection plate 13 is replaced with a gray standardized reflection plate.

Because the light source unit 14 illuminates the standardized reflection plate 13 at its initial position, the light reflected from the plate 13 is received by the light measuring unit 33 to detect light amounts W1, W2 and W3 for the respective colors (blue, green, red). The exposure condition setting circuit shown in FIG. 4 sets the copying machine to a proper exposure condition by adjusting the positions of the color filters Y, M and C in such a way that the light measuring unit 33 detects amounts of light W1, W2 and W3 which agree with the white-level exposures EW1, EW2 and EW3, respectively. This adjustment completes the copying condition setting operation of the copying machine. Actual color copying is effected in the same way as described in the previous embodiment.

In the second embodiment, although the standardized reflection plate 13 is used in order to obtain the white-level exposures, it is permissible to adjust the positions of the color filters Y, M and C using a filter characteristic curve relating filter positions to log exposures as shown in FIG. 12. With reference to this curve, a proper filter position for each color filter Y, M, C can be obtained correspondingly to the white-level exposure EW obtained on the characteristic curve shown in FIG. 11.

The data comprising the filter characteristic curve is usually provided upon designing the copying machine and is memorized in the ROM 74. Alternatively, the curve may be generated by measuring the amount of light passed through the color filter as the color filter is gradually changed in position.

In the above-described embodiments, no color correction is effected for the various color originals to be copied. It may be desirable to effect color and density corrections according to the various color originals in order to provide good quality color copies. To provide such color correction, each color original may be measured to detect color densities at various points thereof for each of the three colors, so as to enable the readjustment of the color filters to reset the color copying conditions. In the same manner as for the test chart 11, the measurement and copying of the color original is effected in the course of one round trip of the light source unit 14.

Figure 13:
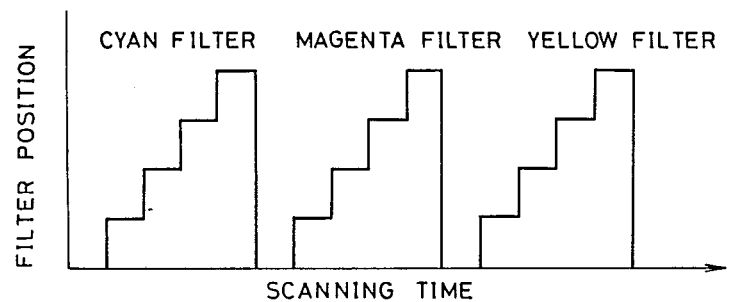
FIG. 13 is an explanatory illustration showing the sequence of forming a pseudo test chart.

In place of the test chart 11, the color filters Y, M and C may be used in combination to provide a pseudo chart. In more detail, and as shown in FIG. 13, the standardized reflection plate 13 or the white light opaque cover 12 is scanned with light from the light source unit 14 through the respective color filters in order. At this time, each color filter is changed stepwise in position. It is also possible to replace the color filters with three color light sources, either yellow, magenta and cyan, or blue, green and red.

Figure 14:
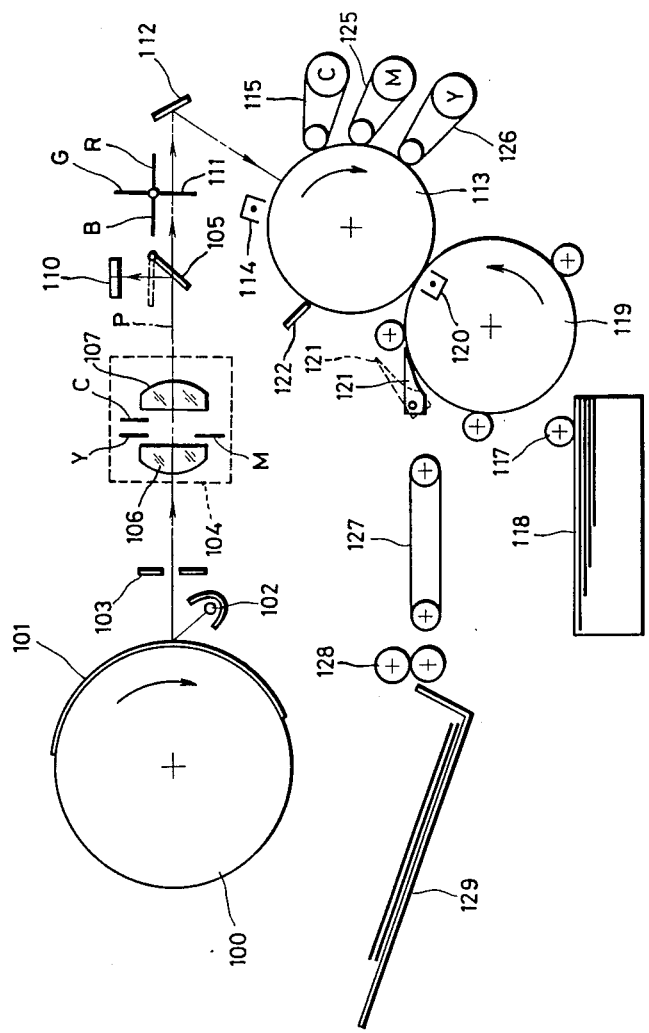
FIG. 14 is another example of a color image copying machine embodying the present invention.

FIG. 14 illustrates an electrostatic color image copying machine embodying the copying condition setting arrangement of the invention. A test chart 101 or a color original is placed around a rotary drum 100 adapted to make three continuous rotations for every image reproduction and is scanned lengthwise with illuminating light from lamp 102. The light is reflected from the surface of the test chart 101 to travel toward a swingable mirror 105 disposed in the optical path at 45° after passing through a slit plate 103 and a lens unit 104. The lens unit 104 comprises front and rear lens groups 106, 107 and color filters Y, M, C movably disposed between the front and rear lens groups. When the copying machine is in the copying condition setting mode, the test chart 101 wound around the rotary drum 100 is scanned with illuminating light from lamp 102. The reflected light from the test chart 101, after passing through the color filters Y, M, C placed at their original positions, is reflected by the swingable mirror 105 and directed to a light measurement unit 110 similar to that previously described in the copying machine shown in FIG. 3. The light measurement unit performs light measurement during one full revolution of the rotary drum 100.

After measurement of the test chart 101, the swingable mirror 105 is pivoted up to the position shown by the dotted line in FIG. 14 to allow light from the test chart 101 to travel forwardly, permitting copying of the test chart. A filter assembly having red, green and blue filters R, G and B and a light shielding plate 117 is synchronized with the rotary drum 100 so as to insert one of the three color filters in the optical path for each revolution of the rotary drum 100. In this manner, a three color sequential exposure is obtained. Specifically, on exposing a cyan image, the red filter R is placed in the optical path in place of the light shielding plate 111 for one full revolution of the rotary drum 100. According to the exposure effected based on the red reflection density of the test chart 101, a voltage is controllably impressed upon a charging device 114.

During rotation of the photosensitive drum 113 synchronized with rotary drum 100, the outer surface of the photosensitive drum 113 is charged with electricity according to the exposure for red. The light passing through the red filter R, after being reflected by mirror 112, reaches the outer surface of photosensitive drum 113 to expose the same. As a result of this exposure, the exposed portions of the surface of the photosensitive drum 113 are discharged, while non-exposed parts are maintained electrically charged to thereby form an electrostatic latent image of the test chart 101 on the outer surface of the photosensitive drum 113. This electrostatic image is then developed by a cyan developing device 115 to form a cyan toner image.

Simultaneously with the rotation of the photosensitive drum 113, a feeding roller 117 rotates to withdraw and feed an image recording sheet 118 to a rotatable drum 119. The rotatable drum 119 conveys the recording sheet 118 so as to charge it with electricity by means of a charging device 120. As a result, the cyan toner image formed on the outer surface of the photosensitive drum 113 is transferred onto the charged recording sheet 118. The rotatable drum 119 continues to rotate so as to convey the recording sheet 118 toward the charging device 120. Shown as 122 is a cleaner for removing any toner left on the outer surface of the photosensitive drum 113.

After transfer the cyan toner image onto the image recording sheet 118, the green filter G is placed in the optical path P. As the photosensitive drum 113 is synchronized with the rotary drum 100, a latent electrostatic image in the green tone is formed on the outer surface of the photosensitive drum 113 and is developed as a magenta toner image by a magenta developing device 125. This magenta toner image is transferred to the recording sheet 118 by the charging device 120. In the same way, a yellow toner image is transferred onto the recording sheet 118. These three toner images are overlapped on the recording sheet 118 to form a color copy image of the test chart 101. After the three revolutions of the rotary drum 119, a sheet pick-up arm 121 moves to the position shown in solid lines in FIG. 14 to remove the recording sheet 118 from the rotary drum 119 and guide it to the conveyor 127. The recording sheet 118 is sent to a fixing device 128 via the conveyor 127, where pressure and heat are applied to the recording sheet 118 so as to fix the three color toner image thereon. The recording sheet with the fixed color image is thereafter ejected as a color copy into the tray 129.

The color copy of the test chart 101 is wound around the rotary drum 100 so as to be measured during one full revolution of the rotary drum 100. In the same manner as described with respect to the copying machine shown in FIGS. 1-4, the characteristic curves shown in FIGS. 8 or 11 are generate and the color filters Y, M and C are adjusted in position so as to perform the setting of the color copying conditions.

For actual copying, after wrapping a color original around the rotary drum 100, the drum is rotated through three revolutions to form cyan, magenta and yellow toner images on a recording sheet 118.

In the embodiments described above, it is permissible to use yellow, magenta and cyan light sources or blue, green and red light sources in place of the color filters. In systems forming an image through the use of a scanning beam such as laser color copying machines, a test chart may be electronically provided in place of the physical test chart or pseudo test chart formed by the color filters. In this case, a copy of the electronic test chart can be measured by the three light measuring means in the same manner as described in this specification to set the proper copying conditions.

Although, in the above described embodiments, the amount of light reflected from the test chart is transformed into a logarithmic value using look-up table B, it is permissible to use the light amount values without logarithmic conversion, using table data A.

Because the same test chart is used for each operation, the amount of light reflected from the test chart during the first scanning operation is substantially constant over time. Therefore, it is advantageous to memorize the amounts of the three color components measured by the first scan when first setting up the copying machine.

Although in the above-preferred embodiments, the test chart is formed of strips, in four density gradations for each color, the test chart may be formed with as few as two different densities within the range of the densities of the originals to be copied. However, a large number of different densities makes it possible to set the copying conditions with higher accuracy.

What is claimed is:

1. A method of setting color copying conditions of a color copying machine, said color copying machine being provided with scanning means for scanning an original with illuminating light; three light measuring means, one individual to each of three primary colors; and three adjustable color filters for regulating respective components of light, said method comprising the steps of:

scanning a test chart having density patterns for said three primary colors to detect three primary color components of light reflected from said test chart using said three light measuring means, so as to obtain three primary color exposures based on said three primary color components;

scanning said test chart to make a color copy thereof;

scanning said color copy to detect three primary color components of light reflected from said color copy using said three light measuring means, so as to detect reflected amounts of light for said three primary colors;

logarithmically transforming said reflected amounts of light into color densities for said three primary colors;

providing relationships between said three primary color densities and said three primary color exposures for said three primary colors; and adjusting said three color filters so as to make said relationships coincide with predetermined relationships between color densities and exposures for said three primary colors, respectively.

2. A method as defined in claim 1, wherein said three primary colors are cyan, magenta and yellow.

3. A method as defined in claim 2, wherein said three light measuring means are photoconversion elements for sensing blue, green and red light, respectively.

4. A method as defined in claim 1, wherein said color filters are cyan, magenta and yellow filters.

5. A method as defined in claim 1, wherein said color filters are adjusted based on relationships between opening positions of said color filters in said copying light path and light amounts passed through said color filters at said positions, respectively.

6. A method of setting color copying conditions of a color copying machine, said copying machine being provided with scanning means for scanning an original to be copied placed on a copy table with illuminating light; cyan, magenta and yellow filters disposed in a copying light path between said copying table and a recording material; and three light measuring means, one individual to each of three primary colors, said method comprising the steps of:

scanning a plate having a constant density with said illuminating light to detect three primary color components of light reflected from said plate through said filters using said three light measuring means, respectively, said filters being placed in turn in said copying light path and changed in position stepwise; so as to obtain three primary color exposures;

scanning said plate again with said illuminating light to make a color copy of said plate through said filters placed in turn in said copying light path;

scanning said color copy to detect three color components of light reflected from said color copy using said three primary light measuring means, so as to detect amounts of light reflected from said color copy for said three primary colors;

logarithmically transforming said reflected amounts of light into color densities of said color copy of said three primary colors;

providing relationships between said color densities and said three primary color exposures for said three primary colors; and adjusting said filters so as to make said relationships coincide with predetermined relationships between densities and exposures for said three primary colors.

7. A method as defined in claim 6, wherein said three light measuring means are photoconversion elements for blue, green and red light.

8. A method as defined in claim 6, wherein said filters are adjusted based on relationships between opening positions of cyan, magenta and yellow filters in said copying light path and light amounts passed through said cyan, magenta and yellow filters at said positions, respectively.

9. A method as defined in claim 7, wherein said plate is a cover having a white reflection surface for covering said original.

10. A method of setting color copying conditions of a color copying machine, said color copying machine being provided with scanning means for scanning an original placed on a copying table with illuminating light and three light measuring means, one individual to each of three primary colors, said method comprising the steps of:

scanning a test chart having density patterns for said three primary colors to detect three primary color components of light reflected from said test chart using said three light measuring means, so as to detect three primary color exposures based on said three primary primary color components;

scanning said test chart again to make a color copy thereof;

scanning said color copy to detect three primary color components of the light reflected from said color copy using said three light measuring means, so as to detect light quantities for said three primary colors;

logarithmically transforming said light quantities into color densities for said three primary colors;

providing relationships between said three primary color densities and said three primary color exposures for said three primary colors; and controlling exposures for said three primary colors based on said relationships, respectively.

11. A method as defined in claim 10, wherein said three primary colors are cyan, magenta and yellow.

12. A method as defined in claim 11, wherein said three light measuring means are photoconversion elements for blue, green and red light.

13. A method as defined in claim 10, prior to performing said step of controlling exposures further comprising the steps of:

detecting exposures as desired values corresponding to white level copy densities, based on said relationships for said three primary colors; and measuring a reflection plate having said white level copy densities to detect light reflected from said reflection plate for said three primary colors; and wherein said controlling exposure step further comprises the step of adjusting cyan, magenta and yellow filters located in a copying light path so that said white level copy densities coincide with said light reflected from said reflection plate for said three primary colors to thereby control said three primary color exposures.

14. A method as defined in claim 10, prior to performing said step of controlling exposures further comprising the steps of:

detecting exposures as desired values for said three primary colors corresponding to white level copy densities, based on said relationships for said three primary colors; and wherein said controlling exposure step further comprises the step of adjusting cyan, magenta and yellow filters located in a copying light path based on relationships between opening positions of said color filters and light amounts passed through said color filters at said positions for each filter to thereby control said three primary color exposures.

15. A method of setting a color copying machine to various copying conditions, said copying machine being provided with a scanning means for scanning an original to be copied with illuminating light; cyan, magenta and yellow filters disposed in a copying light path between said original and a recording material; and three light measuring means, one individual to each of three primary colors; said method comprising the steps of:

scanning a plate having a uniform density to detect three primary color components of light reflected from said plate through said cyan, magenta and yellow filters disposed in turn in said optical path and stepwise changed in position, using said three light measuring means, respectively, so as to obtain three color exposures for said three primary colors;

scanning said plate again with said illuminating light so as to make a color copy of said plate through said filters placed in turn in said copying light path;

scanning said color copy to detect three primary color components of light reflected from said color copy using said three light measuring means, so as to detect amounts of light reflected from said color copy for said three primary colors;

logarithmically transforming said amounts of light into color densities for said three primary colors;

providing relationships between said color densities and said three color exposures for said three primary colors; and controlling exposures for said three primary colors based on said relationships, respectively.

16. A method as defined in claim 15, wherein said light measuring means are photoconversion elements for blue, green and red light.

17. A method as defined in claim 15, prior to performing said step of controlling exposures further comprising the steps of:

detecting exposures as desired values corresponding to white level copy densities based on said relationships for said three primary colors; and measuring a reflection plate having said white level copy densities to detect light reflected from said reflection plate for said three primary colors; and wherein said controlling exposure step further comprises the step of adjusting cyan, magenta and yellow filters so as to make said detected exposures coincide with said desires values for said three primary colors, thereby controlling said three primary color exposures.

18. A method as defined in claim 15, prior to performing said step of controlling exposures further comprising the steps of:
  detecting exposures as desired values corresponding to white level copy densities, based on said relationships for said three primary colors; and
  wherein said controlling exposure step further comprises the step of adjusting cyan, magenta and yellow filters based on relationships between opening positions of said cyan, magenta and yellow filters and light amounts passed through said filters, said adjustments being made by altering the opening position of said filters, respectively, thereby controlling said three primary color exposures.

19. A method as defined in claim 17, wherein said plate is a cover having a white reflection surface for covering said original.

20. A method of setting color copying conditions of a color copying machine comprising the steps of:
  making a color copy of density patterns in three primary colors;
  scanning said color copy with illuminating light to detect the amount of three primary color light components reflected from said color copy, using said three primary light measuring means;
  logarithmically transforming said light amounts into color densities for said three primary colors;
  providing relationships between said three primary color densities and said light amounts previously memorized in a memory of said color copying machine for said three primary colors;
  detecting exposures as desired values corresponding to white level copy densities based on said relationships for said three colors; and
  measuring a reflection plate having said white level copy densities to detect light reflected from said reflection plate for said three colors; and
  subsequently controlling three color exposures based on said relationship by adjusting cyan, magenta and yellow filters positioned in a copying light path so as to make said detected exposures coincide with said desires values for said three colors, thereby controlling said three color exposures.

21. A method of setting color copying conditions of a color copying machine comprising the steps of:
  making a color copy of density patterns in three primary colors;
  scanning said color copy with illuminating light to detect the amount of three primary color light components reflected from said color copy, using said three primary light measuring means;
  logarithmically transforming said light amounts into color densities for said three primary colors;
  providing relationships between said three primary color densities and said light amounts previously memorized in a memory of said color copying machine for said three primary colors;
  detecting exposures as desired values corresponding to white level copy densities based on said relationships for said three colors; and
  subsequently controlling three color exposures based on said relationship by adjusting cyan, magenta and yellow filters positioned in a copying light path based on relationships between opening positions of said cyan, magenta and yellow filters and light amounts passed through said color filters to amounts of light passed through said color filters at said positions for said three colors, thereby controlling said three color exposures.

22. A method as defined in claim 1, wherein said illuminating light is in the form of slit illumination.

23. A method as defined in claim 1, wherein said illuminating light is in the form of a flying spot.

24. A method of setting color copying conditions of a color copying machine, said copying machine being provided with scanning means for scanning an original with illuminating light; three light measuring means, one individual to each of three primary colors; and filters for regulating respective components of light, said method comprising the steps of:
  scanning a test chart having density patterns for said three primary primary colors to detect three primary color components of light reflected from said test chart using said three light measuring means, so as to obtain three primary color exposures based on said three primary color components and store them in a memory; and
  setting copying conditions for said three primary colors, said setting step comprising the steps of:
    scanning said test chart to make a color copy thereof;
    scanning said color copy to detect three primary color components of light reflected from said color copy using said three primary light measuring means, so as to detect reflected amounts of light for said three primary colors;
    logarithmically transforming said reflected amounts of light into color densities for said three primary colors;
    providing relationships between said three primary color exposures read out from said memory and said three primary colors densities; and
    adjusting said three color filters so as to make said relationships coincide with predetermined relationships between color densities and exposures for said three primary colors, respectively.

25. A method as defined in claim 24, wherein said three primary color exposures are stored in said memory after being logarithmically transformed.

26. A method as defined in claim 24, wherein said three primary colors are cyan, magenta and yellow.

27. A method as defined in claim 26, wherein said three light measuring means are photoconversion elements for sensing blue, green and red light, respectively.

28. A method as defined in claim 24, wherein said color filters are cyan, magenta and yellow filters.

29. A method as defined in claim 24, wherein said color filters are adjusted based on relationships between said color filters between positions in said copying light path and light amounts passed through said color filters at said positions, respectively.

30. A method of setting color copying conditions of a color copying machine, said copying machine being provided with scanning means for scanning an original placed on a copying table with illuminating light and three light measuring means, one individual to each of three primary colors, said method comprising the steps of:
  scanning a test chart having density patterns for said three primary primary colors to detect three primary color components of light reflected from said test chart using said three light measuring means, so as to obtain three primary color exposures based on said three primary color components and store them in a memory; and setting copying conditions for said three primary colors, said setting step comprising the steps of:

scanning said test chart again to make a color copy thereof;

scanning said color copy to detect three primary color components of light reflected from said color copy using said three primary light measuring means, so as to detect light quantities for said three primary colors;

logarithmically transforming said light quantities into color densities for said three primary colors;

providing relationships between said three primary color exposures read out from said memory and said three primary colors densities; and controlling exposures for said three colors, based on said relationships, respectively.

31. A method as defined in claim 30, wherein said three primary colors are cyan, magenta and yellow.

32. A method as defined in claim 31, wherein said three light measuring means are photoconversion elements for sensing blue, green and red light, respectively.

33. A method as defined in claim 30, wherein said three primary color exposures are stored in said memory after being logarithmically transformed.

* * * * *